UNITED STATES PATENT OFFICE.

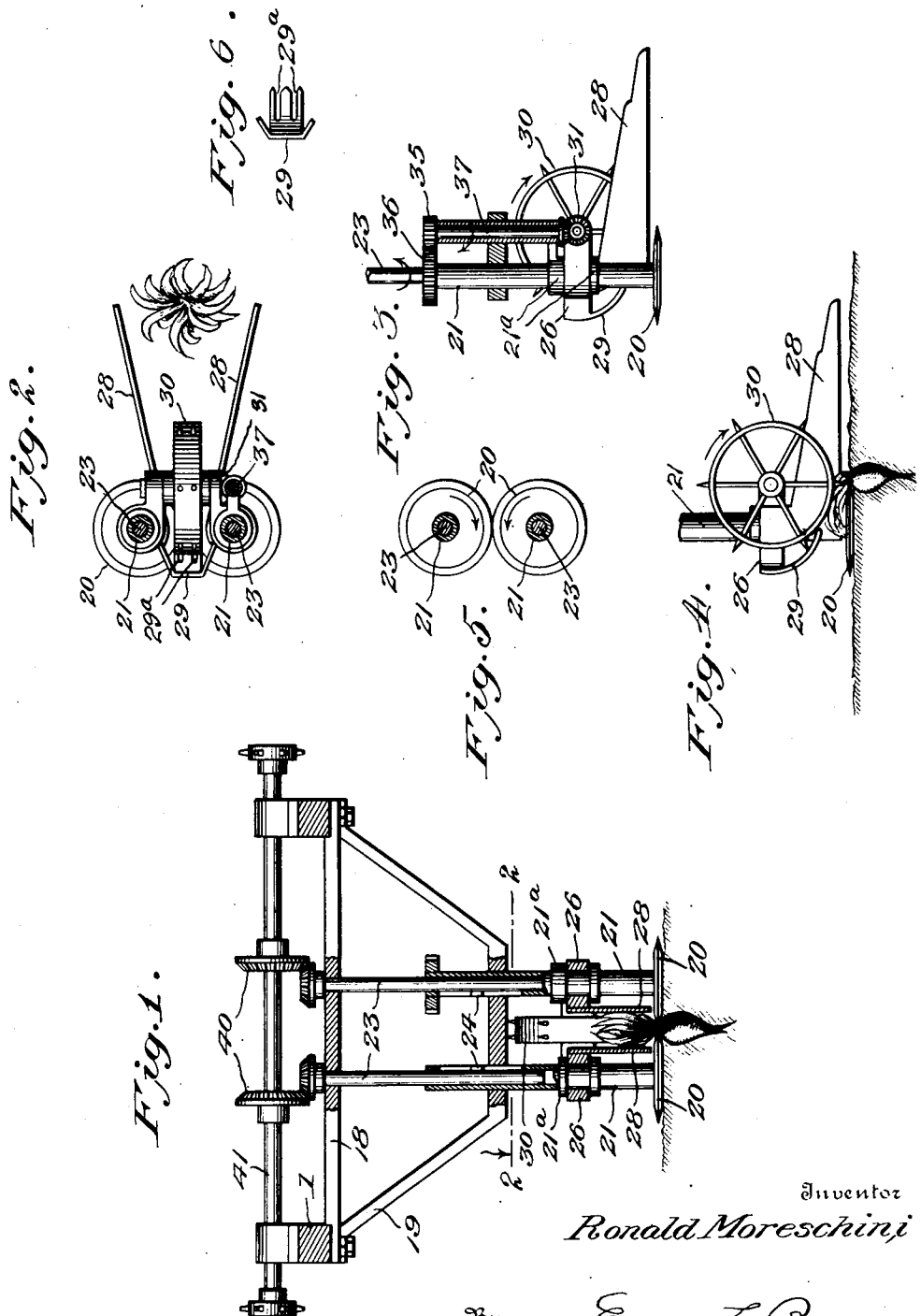

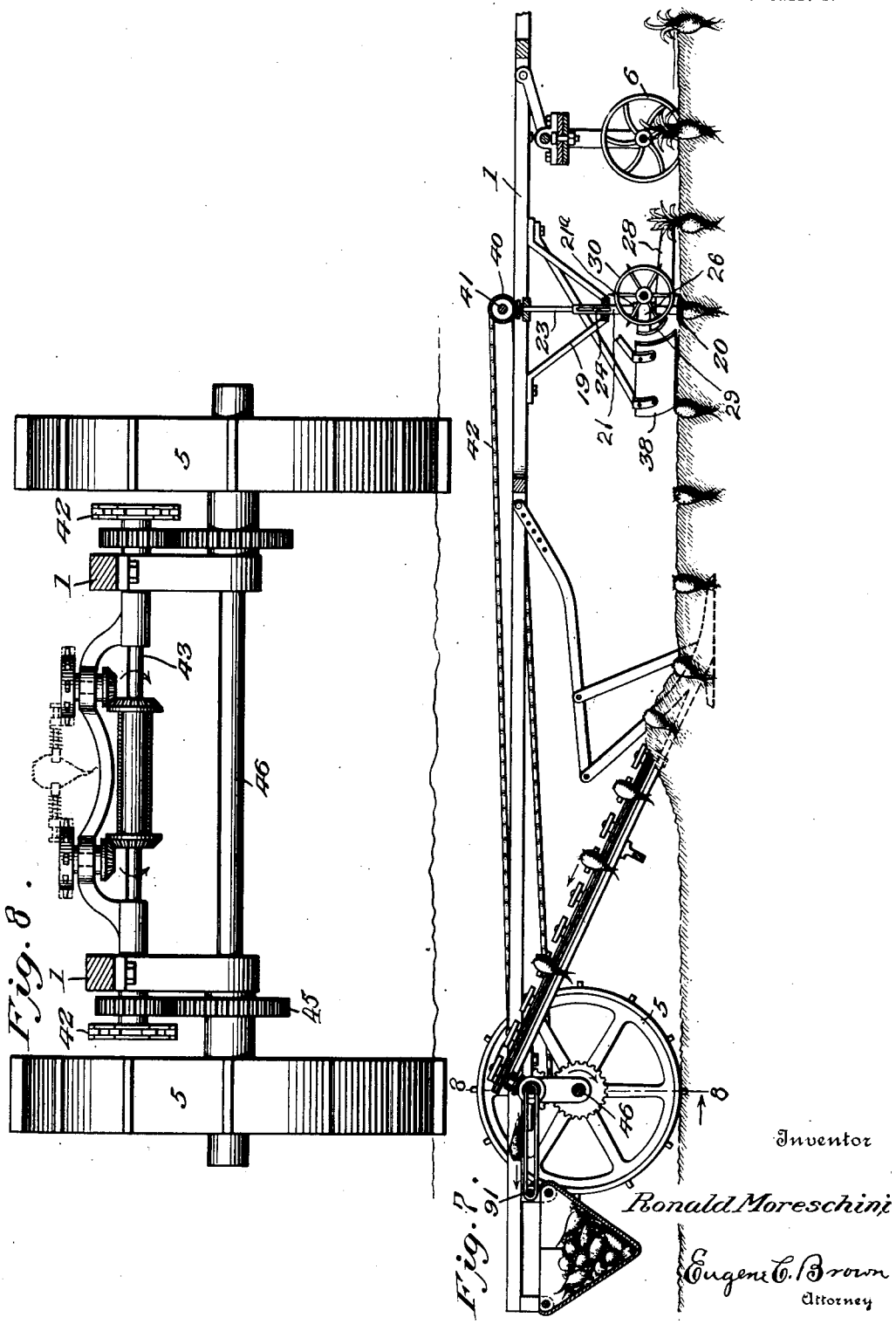

RONALD MORESCHINI, OF PUEBLO, COLORADO.

BEET-HARVESTER.

1,366,477.   Specification of Letters Patent.   Patented Jan. 25, 1921.

Application filed February 18, 1918. Serial No. 217,849.

*To all whom it may concern:*

Be it known that I, RONALD MORESCHINI, a citizen of the United States, residing at Pueblo, in the county of Pueblo and State of Colorado, have invented certain new and useful Improvements in Beet-Harvesters, of which the following is a specification.

My invention relates to machines for topping vegetables and is intended particularly for the harvesting of beets.

In the accompanying drawings Figure 1 is an end view partly in section, illustrating a beet topping device embodying my invention; Fig. 2 is a horizontal sectional view taken on the line 2—2 of Fig. 1; Fig. 3 is a side elevation of the same partly in section; Fig. 4 is a fragmentary side elevation showing the manner of pushing the beet tops backwardly over the cutters; Fig. 5 is a detail top plan view of the cutters; Fig. 6 is an enlarged detail view of the toothed cleaning guard; Fig. 7 is a longitudinal sectional view of a beet harvesting machine embodying my invention and showing the relation of the topping device to the other parts of the machine; and Fig. 8 is a vertical sectional view of the line 8—8 of Fig. 7.

The frame or bed 1, of the machine is carried upon rear tractor wheels 5 and front steering wheel 6, which may be raised or lowered to regulate the height of the frame by lever mechanism in the usual manner.

The beet topping mechanism, shown in detail in Figs. 1 to 6 inclusive, is carried by frame members 18, 19, bolted to the main frame 1. The cutters or knives 20, are mounted on the lower ends of sleeves 21, telescopically mounted upon the shafts 23, which are provided with pins 24 sliding in slots in the sleeves to provide a driving connection while permitting relative longitudinal movement. Perforated brackets 26, loosely surrounding the sleeves and held between flanges 21ª thereon, carry depending guiding arms 28 and are connected in the rear by a scraper plate 29 adapted to clean the feeding wheel 30, and provided with slots 29ª to permit the passage of the spurs on said wheel. The forward ends of the brackets 26, are provided with bearings for the axle of the feeding wheel 30, the axle being provided with a miter-gear 31 meshing with a gear on the short shaft 37, which is driven from one of the shafts 23, through gears 35, 36. As the machine is moved forward over the beets the guard arms 28 bring the leaves of the beet tops together until they are caught by the spurs of the revolving feed wheel 30 and turned backwardly as they pass between the disk cutters 20. As the tops are severed they are caught by the slanting cross-board 38, which guides them laterally to the outside of the machine.

The disk cutters 20 and feed wheel 30 are connected by miter-gears 40, with the shaft 41, which is driven through the chains 42, from the counter shaft 43, geared at 45 with the main axle 46, of the traction wheels.

The operation of my machine will be understood from the foregoing description of parts. As the machine is drawn over the furrows by horse or tractor power, the beet tops are gathered together as they pass between the guide arms 28 and are caught by the spurs on the wheel 30 which is positively driven from the shaft 41 by means of the intermediate transmitting mechanism which includes the gears 31, 35, 36 and 40, the beet tops being thereby pushed backwardly in the manner indicated in Fig. 4 and are severed by the rotating disk cutters 20, the tops being then caught by the inclined scraper 38 which directs them outwardly beyond the path of travel of the machine. The topped beets are then ready to be loosened from the soil and lifted by the plow members in the manner well understood.

When the forward end of the machine frame has been adjusted to the proper height, the beet topping mechanism will automatically adjust itself to any slight inequalities in the surface of the ground. The cutters are automatically positioned with respect to each beet by the fact that they are carried by the sleeves 21 connected with the axle of the beet top feeding wheel 30 which is slightly in advance of the cutters and as it rides up over the beet top, it raises the cutters to just the proper height or position and thereby supports the cutters as the beet top is being severed. It should also be noted that I prevent any clogging of the cutters by first folding the leaves of the beet top together laterally by means of the conveying guide arms 28 and then push or fold them backwardly by means of the spurred feeding wheel 30 as the beet approaches the cutters. The rim and spurs of the feed wheel are constantly cleaned by the scraper or comb 29. The yielding fingers of the grabbers automatically adjust themselves to the different sizes of the beets so that they will all be conveyed from the plows to the hopper without injury.

I have described in detail the particular construction illustrated in the accompanying drawings for the purpose of clearly and definitely disclosing one embodiment of my invention but it will be apparent to engineers that various changes and modifications may be made in the several parts without in any manner departing from my invention.

I claim:

1. In a beet harvesting machine, the improvement in the topping apparatus comprising a pair of vertical shafts mounted for rotation in the machine frame, sleeves slidably spliced thereon, horizontal cutters secured to the lower ends of said sleeves, a top feeding wheel provided with prongs and rotatably mounted upon a horizontal shaft carried by said sleeves and driving connections between said feed wheel and said sleeves whereby the cutters are automatically adjusted in height as the feed wheel passes over the beet tops.

2. A machine as set forth in claim 1, with lateral guides one upon each side of the feed wheel secured to said slidable sleeves for folding the beet tops together before they are pushed backwardly by said wheel over the cutters.

In testimony whereof I affix my signature.

RONALD MORESCHINI.